United States Patent
Pfiffner et al.

[15] 3,697,543
[45] Oct. 10, 1972

[54] EPITHIO COMPOUNDS

[72] Inventors: Albert Pfiffner, Arlesheim; Ulrich Schwieter, Reinach, both of Switzerland

[73] Assignee: Hoffmann-La Roche Inc., Nutley, N.J.

[22] Filed: Sept. 16, 1969

[21] Appl. No.: 858,534

[52] U.S. Cl. .........260/327 E, 260/240 R, 260/240.1, 260/348 A, 260/348 R, 260/405.5, 260/408, 260/476 R, 260/488 H, 260/593 R, 260/594, 260/612 R, 260/614 R, 260/632, 260/654 R, 424/246, 424/248, 424/250, 424/268, 424/270, 424/272, 424/273, 424/274, 424/275, 424/278
[51] Int. Cl. .....................A61k 27/00, C07d 59/00
[58] Field of Search........................260/240 R, 327 E

[56] References Cited

OTHER PUBLICATIONS

Horner, et al., Chem. Ber. 91: 61– 63 (1958).
Morrison, et al. Org. Chem. (Allyn & Bacon, Boston, 1965), p. 493, 495.

*Primary Examiner*—Henry R. Jiles
*Assistant Examiner*—Cecilia M. Shurko
*Attorney*—Samuel L. Welt, Bernard S. Leon, William H. Epstein, George M. Gould and Jon S. Saxe

[57] ABSTRACT

Epithio unsaturated aliphatic acids, nitriles, and alcohols, and ether, ester and amide derivatives thereof and epoxy unsaturated aliphatic acids, nitriles, and alcohols, and ether, ester and amide derivatives thereof, which are useful in killing and preventing proliferation of insects by upsetting their hormone balance.

7 Claims, No Drawings

EPITHIO COMPOUNDS

SUMMARY OF THE INVENTION

The invention is directed to compounds of the formula:

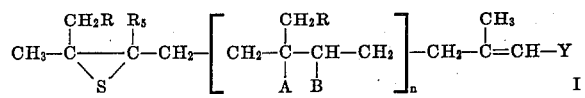

wherein A and B are hydrogen or taken together form a carbon to carbon double bond or a sulfur bridge; R is hydrogen or lower alkyl; $R_5$ is methyl or hydrogen; Y is a member selected from the group consisting of $-O \equiv N$; $-COOR_1$;

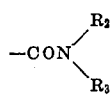

and $-CH_2OR_4$; $R_1$ is selected from the group consisting of hydrogen, phenyl, benzyl, lower alkyl, and substituted phenyl or benzyl; $R_2$ and $R_3$ are hydrogen or lower alkyl, or taken together with their attached nitrogen atom form a five or six membered heterocyclic ring containing at most one additional hetero atom selected from the group consisting of oxygen, nitrogen or sulfur; $R_4$ is hydrogen, lower alkyl, lower alkanoyl, benzoyl, lower alkyl substituted benzoyl, amino lower alkyl, lower alkyl substituted amino-lower alkyl, benzyl, phenyl, substituted benzyl, substituted phenyl; and $n$ is an integer from 0 to 1; which are useful in upsetting the hormone balance of pests such as insects.

The compounds of formula I above are prepared by reacting a compound of the formula:

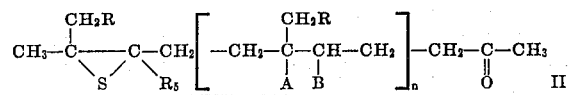

wherein R, $R_5$, A, B and n are as above; with the phosphine oxide of the formula:

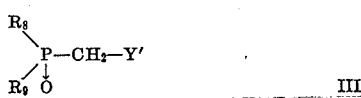

wherein Y' is selected from the group consisting of $-C \equiv N$; $-COOR'_1$; and

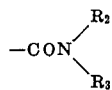

$R'_1$ is lower alkyl, phenyl, benzyl or substituted phenyl and benzyl; $R_8$ and $R_9$ are lower alkoxy or phenoxy, or phenoxy substituted with a radical selected from the group consisting of lower alkoxy, nitro or halo; and $R_2$ and $R_3$, are as above.

In accordance with another embodiment of this invention, compounds of the formula I above are prepared by episulphidizing a compound of the formula:

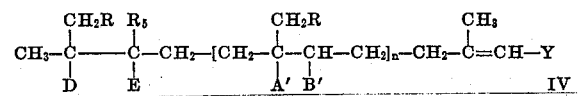

wherein $R_5$, R, Y and n are as above; A' and B' are hydrogen, or taken together form a carbon to carbon double bond or any oxygen bridge; D is hydroxy; E is halogen, or taken together with D form an oxygen bridge.

If desired, the compound of formula IV above, wherein Y is $-CH_2OH$ and D and E form a sulfur bridge, can be esterified or etherified to form the corresponding ester or ether of formula IV above. The ester can, if desired, be saponified to form the corresponding free alcohol of formula IV above.

In accordance with another embodiment of this invention we have found that intermediates for compounds of formula I which have the formula:

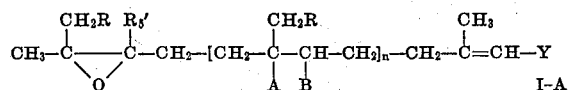

wherein R, Y, A and B, and n are as above, and $R_5'$ is lower alkyl, preferably methyl and ethyl.

are also useful in upsetting the hormone balance of pests such as insects.

DETAILED DESCRIPTION OF THE INVENTION

As used throughout the application, the term "lower alkyl" comprehends both straight and branched chain saturated hydrocarbon groups containing from one to six carbon atoms such as methyl, ethyl, propyl, isopropyl, etc. The term "lower alkoxy" comprehends lower alkoxy groups containing from one to six carbon atoms such as methoxy, propoxy, ethoxy, etc. The term "lower alkoxy carbonyl" as used throughout this application, comprehends lower alkoxy carbonyl groups wherein the lower alkoxy substituent contains from one to six carbon atoms. Examples of lower alkoxy carbonyl groups are methoxy-carbonyl, ethoxy-carbonyl and isopropoxy-carbonyl with the methoxy-carbonyl and ethoxy-carbonyl groups being preferred.

The term "lower alkyl-substituted amino lower alkyl" groups as used throughout this application comprehends both monolower alkyl substituted amino lower alkyl groups and dilower alkyl substituted amino lower alkyl groups wherein the lower alkyl moiety or moieties contain from one to six carbon atoms. Among the preferred lower alkyl substituted amino alkyl groups are monomethylamino-methyl, dimethylamino-ethyl, monoethylamino-propyl, diethylamino-methyl, monoisopropylamino-propyl, and diisopropylamino-ethyl. As used in this application, the term "halogen"

includes all four halogens such as bromine, chlorine, fluorine and iodine with fluorine, chlorine and bromine being preferred. The term "lower alkanoyloxy" as used throughout the specification includes lower alkanoyloxy groups containing from one to six carbon atoms such as acetyloxy, formyloxy, propionyloxy, butyryloxy, etc.

When, in the compound of formulas I or I-A above, $R_2$ and $R_3$ form a five or six membered heterocyclic ring, with their attached nitrogen atom, the ring can contain an additional heteroatom such as nitrogen, oxygen or sulfur. Among the preferred five or six membered heterocyclic ring moieties formed by $R_2$ and $R_3$ taken together with their attached nitrogen atom are included pyrrolidino, piperidino, and morpholino.

When $R_1$, in the compound of formula I above is a substituted or unsubstituted phenyl or benzyl, in accordance with a preferred embodiment of the invention, the compound of formula I has the formula:

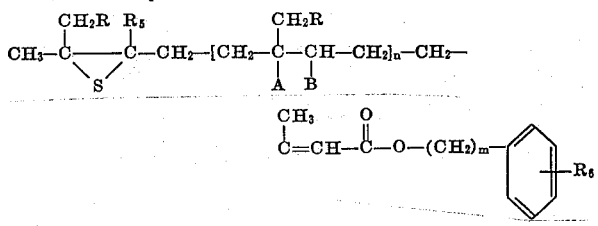

wherein $n$, $R$, $R_5$, A, and B are as above; $R_6$ is lower alkyl, hydroxy, lower alkoxy, hydrogen or halogen, and $m$ is an integer of 0 to 1.

When $R_4$, in the compound of formula I above is a substituted or unsubstituted benzyl or phenyl, a preferred embodiment of the compound of formula I above has the following formula:

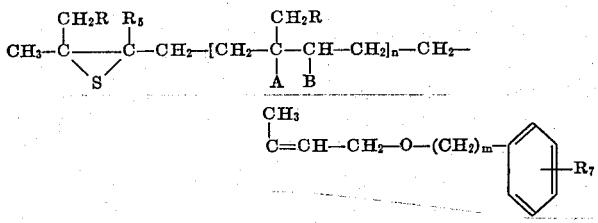

wherein R, $R_5$, A, B, $n$, and $m$ are as above; and $R_7$ is lower alkyl, lower alkoxy, hydrogen, methylenedioxy, low alkoxy carbonyl, phenyl lower alkyl, lower alkanoyl, halogen, benzoyl, and lower alkyl benzoyl.

When $R_4$ and $R_7$ are lower alkyl benzoyl, the preferred radicals are toluyl and p-ethyl benzoyl.

The compounds of formulas I and I-A above are useful in the control of pests such as insects which include *Tenebrio molitor* (yellow mealworm), *Tineola biselliella* (clothes moth), *Carpocapsa pomonella* (codling moth), *Leptinotarsa decemlineata* (Colorado beetle), *Calandra granaria* (grain weevil), etc. In contrast to most of the known pest-control agents which kill, disable or repell the pests by acting as contact-poisons and feed-poisons, the compounds of formula I and I-A above and said mixtures thereof prevent maturation and proliferation of these pests by upsetting their hormone balance. In insects, for example, the transformation into the imago is disturbed. Furthermore, the sequence of generations is interrupted and the insects are indirectly killed.

The compounds of formula I and I-A above are practically non-toxic to vertebrates. The toxicity of these compounds in vertebrates is greater than 1,000 mg/kg body weight. Moreover, these compounds are readily degrated and the risk of accumulation is therefore excluded. Therefore, these compounds can be used without fear or danger in the control of pests in animals, plants, foods and textiles.

Generally, in controlling invertebrate animals, the compounds of formula I and I-A above are applied to the material to be protected, e.g., foodstuffs, feeds, textiles, plants in an amount from about 0.01 percent to 0.1 percent by weight of the material to be protected. Generally, it is preferred to utilize the compounds of formulas I or I-A above in a composition with a suitable inert carrier. Any conventional inert carrier can be utilized. The composition which contains an effective amount of the compounds of formulas I or I-A above should be applied to the material to be protected to provide a concentration of from about 0.01 percent to 0.1 percent of the compound of formula I above on said material.

The compounds of formulas I and I-A above can, for example, be used in the form of emulsions, suspensions, dusting agents, solutions or aerosols. In special cases, the materials to be protected (e.g., foodstuffs, seeds, textiles and the like) can also be directly impregnated with the appropriate compound or with a solution thereof. Moreover, the compounds can also be used in a form which only releases them by the action of external influences (e.g., contact with moisture) or in the animal body itself.

The compounds of formula I and I-A above can be used as solutions suitable for spraying on the material to be protected which can be prepared by dissolving or dispersing these compounds in a solvent such as mineral oil fractions; cold tar oils; oils of vegetable or animal origins; hydrocarbons such as naphthalenes ketones such as methyl ethyl ketone; or chlorinated hydrocarbons such as tetrachloroethylene, tetrachlorobenzene, and the like. The compounds of formula I and I-A above can also be prepared in forms suitable for dilution with water to form aqueous liquids such as, for example, emulsion concentrates, pastes or powders. The compounds of formula I and I-A above can be combined with solid carriers for making dusting or strewing powders as, for example, talc, kaolin, bentonite, calcium carbonate, calcium phosphate, etc. The compositions containing the compound of formula I above can contain, if desired, emulsifiers, dispersing agents, wetting agents, or other active substances such as fungicides, bacteriacides, nematocides, fertilizers and the like.

Among the compounds of formula I which are especially suited for killing and preventing the proliferation insects are included:

(6,7-epithio-3,7-dimethyl-2-octenyl) methyl ether;
6,7-epithio-3,7-dimethyl-2-octenoic acid ethyl ester;
(10,11-epithio-3,7,11-trimethyl-2,6-dodecadienyl) methyl ether;
($\alpha$-phenyl-p-tolyl)(10,11-epithio-3,7,11-trimethyl-2-cis/trans,6-cis-dodecadienyl) ether;
(10,11-epithio-7-ethyl-3,11-dimethyl-2,6-tridecadienyl) methyl ether;
10,11-epithio-N,N-diethyl-3,7,11-trimethyl-2,6-dodecadienoic acid amide;
10,11-epithio-3,7,11-trimethyl-2,6-dodecadienoic acid ethyl ester;

10,11-epithio-3,7,11-trimethyl-2,6-tridecadienoic acid ethyl ester;

10,11-epithio-7-ethyl-3,11-dimethyl-2,6-tridecadienoic acid ethyl ester;

10,11-epithio-3,7,10,11-tetramethyl-2,6-dodecadienoic acid ethyl ester; and 10,11-epithio-3,7,11-trimethyl-2,6-dodecadien-nitrile.

Among the compounds of formula I-A which are especially suited for killing and preventing proliferation of insects are included:

(10,11-epoxy-3,7,10,11-tetramethyl-dodeca-2,6-dienyl)-methyl ether;

10,11-epoxy-N,N-diethyl-3,7,10,11-tetramethyl-2,6-dodecadienoic acid amide; and 10,11-epoxy-3,7,10,11-tetramethyl-dodeca-2,6-dienoic acid ethyl ester.

Among the compounds of formula II which are produced in accordance with this invention are included:

5,6-epithio-6-methyl-heptan-2-one;
9,10-epithio-6,10-dimethyl-undec-5-en-2-one;
9,10-epithio-6,10-dimethyl-dodec-5-en-2-one;
9,10-epithio-6-ethyl-10-methyl-dodec-5-en-2-one; and
9,10-epithio-6,9,10-trimethyl-undec-5-en-2-one.

Compounds of formula II above can be prepared via the following reaction scheme:

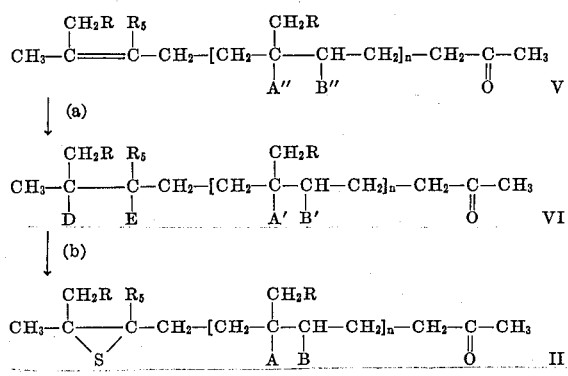

wherein R, n, R$_5$, and A' and B' and A and B and D and E are as above; and A'' and B'' are hydrogen or taken together form a carbon to carbon double bond.

In accordance with this invention, in step (a) the compound of formula V above can be converted to the compound of the formula VI above by either treating the compound formula V above with an N-halosuccinimide and water or by treating the compound of formula V with organic peracids. The treatment of the compound of formula V with an N-halosuccinimide and water selectively and exclusively oxidizes the terminal double bond giving rise to the halohydrins of formula VI, i.e., wherein D is hydroxy and E is halogen. On the other hand, when the compound of formula V above where A'' and B'' form a carbon to carbon double bond, is epoxidized with an organic peracid, epoxidation of one or more of the double bonds within the compound of formula V can be carried out depending upon the conditions utilized.

The compound of formula V is converted into the compound of formula VI wherein D is hydroxy and E is halogen by treating the compound of formula V with an N-halosuccinimide preferably N-bromosuccinimide and water to selectively and exclusively oxidize the terminal bond giving rise to the corresponding halohydrins. The formation of these halohydrins is carried out at a temperature of from 0° to 30°C. The use of N-halosuccinimide and water to hydroxyhalogenate the compounds of formula V selectively hydroxyhalogenates the terminal double bond without affecting any other double bond. An inert organic solvent can be added in addition to the water. Any conventional inert organic solvent can be utilized with tetrahydrofuran being the preferred solvent.

If desired, the halohydrin of formula VI above can be converted into the corresponding epoxy compound by treating the halohydrin with a base. This reaction is preferably carried out in the same reaction medium that was utilized to form the halohydrin. The formation of the oxide from the halohydrin is carried out at a temperature of from 0° to 30°C. Any of the conventional bases such as an alkali metal, alkali metal hydroxide, an alkali metal alcoholate such as sodium methylate, sodium ethylate, etc. can be utilized to convert the compound of formula VI wherein D is hydroxy and E is halogen to the compound of formula VI wherein D and E form an oxygen bridge.

The halohydrin compound of formula VI where A' and B' form a carbon to carbon bond can be converted to the halohydrin compound of formula VI where A' and B' form an oxygen bridge by treating the compound of formula VI with an organic peracid in the manner mentioned hereinafter. In this manner a compound of formula VI is produced wherein D is hydroxy, E is a halogen and A' and B' form an oxygen bridge.

The compound of the formula V above is converted to the epoxide of formula VI, i.e., where D and E and/or A' and B' form an oxygen bridge by treating the compound of formula V with an organic peracid. Any conventional organic peracid can be utilized in this reaction. Among the conventional organic peracids which can be utilized are included peracetic acid, perbenzoic acid, 3-chloroperbenzoic acid and perphthalic acid. This reaction is usually carried out in an inert organic solvent. Any conventional inert organic solvent can be utilized. Among the inert organic solvents which can be utilized, the halogenated hydrocarbons such as methylene chloride and chloroform are preferred. Generally, this reaction is carried out at a temperature of from about 0° to 30°C.

The use of about 1 mole of an organic peracid per mole of the compound of formula V wherein A'' and B'' form a carbon to carbon double bond produces a mixture of the compound of formula VI wherein D and E form an oxygen bridge and the compound of formula VI wherein A' and B' form an oxygen bridge. These isomers can be separated by conventional means such as fractional distillation. If it is desired to epoxidize all of the double bonds in a compound of formula V above wherein A'' an B'' form a double bond, one mole of the compound of formula V is epoxidized in the foregoing manner with at least the number of moles of the organic peracid per double bond contained within one mole of the compound of the formula V.

The compound of formula VI can be episulphidized to the compound of formula II by any conventional means. When the compound of formula VI is a halohydrin, i.e., D is hydroxy and E is halogen, the compound of formula VI is episulphidized in a two-step process. In the first step the halohydrin of formula VI

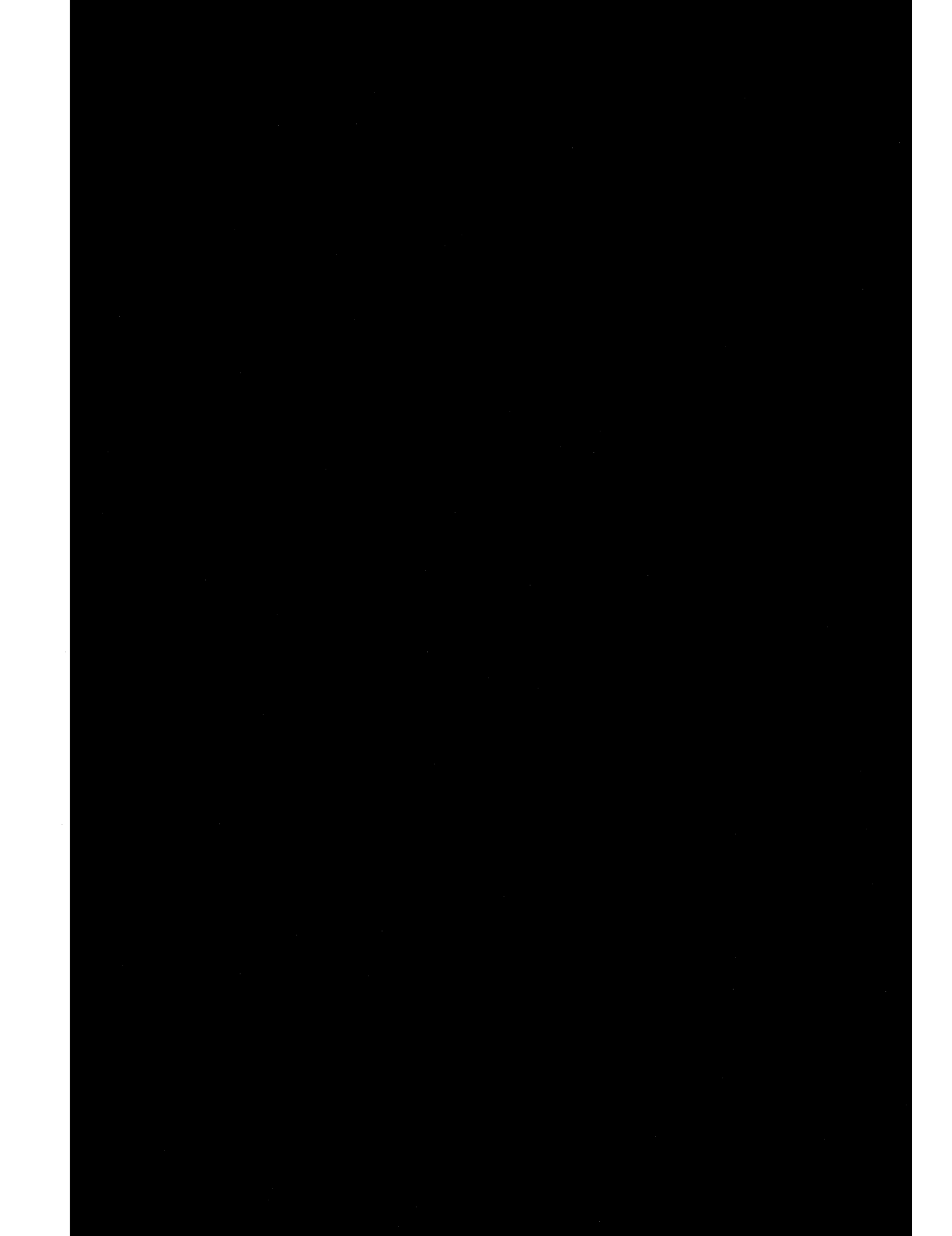

hydrides such as sodium hydride, potassium hydride; alkali metal lower alkoxides, such as sodium methoxide, sodium ethoxide, etc.; and the alkali metal amide bases such as sodamide, potassium amide, sodium methyl amide, potassium methyl amide, as well as other alkali metal lower alkyl amides. In carrying out this reaction, any inert organic solvent can be utilized, such as benzene, toluene, N,N-dimethylformamide, tetrahydrofuran, dioxane, 1,2-dimethoxyethane. In carrying out this reaction, the temperature of from 0° to 30°C. should be utilized.

Among the compounds of formula IV above which are utilized in accordance with this invention are included:

10,11-epoxy-1-ethoxy-3,7,11-trimethyl-2,6-dodecadiene;
3-bromo-12-methoxy-2,6,10-trimethyl-6,10-dodecadien-2-ol;
10,11-epoxy-1-methoxy-3,7,11-trimethyl-2,6-dodecadiene;
10,11-epoxy-1-methoxy-3,7,11-trimethyl-2,6-tridecadiene;
10,11-epoxy-1-methoxy-3,7,10,11-tetramethyl-2,6-dodecadiene;
10,11-epoxy-3,7,11-trimethyl-2,6-dodecadiennitrile;
10-bromo-11-hydroxy-3,7,11-trimethyl-2,6-dodecadienoic acid ethyl ester;
10,11-epoxy-3,7,11-trimethyl-2,6-tridecadienoic acid ethyl ester;
10,11-epoxy-7-ethyl-3,11-dimethyl-2,6-tridecadienoic acid ethyl ester;
10,11-epoxy-3,7,10,11-tetramethyl-2,6-dodecadienoic acid ethyl ester;
10,11-epoxy-N,N-diethyl-3,7,11-trimethyl-2,6-dodecadienoic acid amide.

When Y in the compound of formula IV above is —O≡N; —COOR₁' or

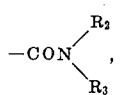

this compound can be prepared by the following reaction scheme:

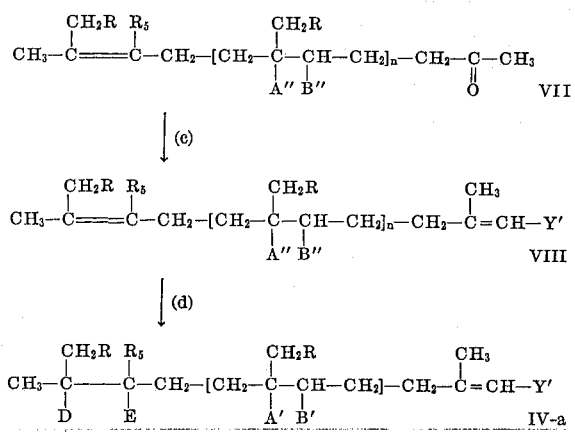

wherein Y', A' and B', A'' and B'' and D and E are as above.

The compound of formula VII is converted to the compound of formula VIII by reaction with a phosphine oxide of formula III above in the same manner described in connection with the conversion of compounds of the formula II into compounds of the formula I above. The compound of the formula VIII above is converted to a compound of the formula IV-a above by either treatment with an organic peracid to epoxidize the terminal double bond and the double done formed by A'' and B'' or by hydroxy halogenation to convert the terminal double bond of the compound of the formula VIII into a halohydrin group. The same conditions that were described in connection with step (a) are utilized in carrying out the reaction of step (d). The compound of the formula IV-a can be converted to the compound of the formula I wherein Y is Y' by episulphidizing the compound of the formula IV-a in the manner described in connection with step (b).

Where Y' is —COO lower alkyl in the compounds of formulas VIII, IV-a or I above, these compounds can be converted to the free acid by any conventional technique of ester hydrolysis or saponification such as treatment with an alkali, i.e., sodium hydroxide, potassium hydroxide, etc.

The free acids of formula VIII can be converted to the corresponding acid amides, i.e., where Y' is

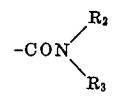

first converting the acid to an acid chloride and then reacting the acid chloride with an amine of the formula:

wherein R₂ and R₃ are as above.

Any of the conditions conventional in converting a free acid to an acid halide can be utilized in this reaction such as by treating the free acid with a halogenating agent such as thionyl chloride in the presence of a base such as pyridine. The acid halide is converted to the compound of formulas I and IV-a above wherein Y is

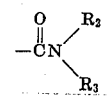

by reacting the acid halide with an amine of the formula XX. Any conventional means for converting acid halides to acid amides can be utilized.

On the other hand, the acid halide can be converted to an ester by reacting the acid halide with an alkali metal alcoholate of the formula:

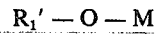

wherein R₁' is as above and M is the alkali metal. Any of the conditions conventional in reacting alkali metal alcoholates with acid halides to form esters can be utilized.

This reaction scheme can be exemplified as follows. Geranyl acetone is condensed in an ethanolic solution with, for example, a dialkyl phosphonoacetic acid ester in the presence of sodium in absolute ethanol. The 3,7,11-trimethyl-2-cis/trans-6-trans-10-dodecatrienoic acid ethyl ester is saponified to the corresponding free acid with an aqueous ethanolic caustic soda solution. The free acid which is obtained can be converted into the acid chloride by any conventional method such as with thionyl chloride in the presence of pyridine. The acid chloride by reaction with an amine of the formula XX can be transformed into an acid amide.

On the other hand, the acid halide can be reacted with an alcohol or alcoholate of the formula XXI to produce an ester. On the other hand, the 3,7,11-trimethyldodeca-2-cis/trans-6-trans-10-trienoic acid ethyl ester can be converted into a bromohydrin. In this process, the ester is dissolved in water/tetrahydrofuran and gradually treated at low temperatures (preferably at 0° to 5°C.) with N-bromosuccinimide. The reaction mixture can then be stirred in the cold for about 6 hours. After this period, it is then treated with a saturated aqueous sodium chloride solution and extracted with hexane. The 10-bromo-11-hydroxy-3,7,11-trimethyl-dodeca-2-cis/trans-6-trans-dienoic acid ethyl ester recovered from the extract can, if desired, be purified by chromatography on Kieselgel.

The bromohydrin can be converted into the corresponding epoxide by first dissolving the bromohydrin in absolute ethanol. This solution is treated dropwise in the cold, generally at about 0°C., with a solution of sodium and absolute ethanol. The reaction mixture is stirred for about 1 hour, then poured into a concentrated aqueous common salt solution and preferably extracted with hexane. From the extract, 10,11-epoxy-3,7,11-trimethyl-dodeca-2-cis/trans-6-trans-dienoic acid ethyl ester is obtained, which can be purified by rectification.

The alcohol and esters thereof of formula I which have the formula:

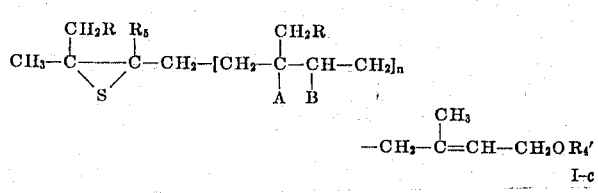

wherein R, $R_5$, A, B and n are as above, and $R_4'$ is lower alkyl, lower alkanoyl, benzoyl, lower alkyl substituted benzoyl, amino lower alkyl, lower alkyl substituted amino, benzyl, phenyl, substituted benzyl, and substituted phenyl, can be prepared from an alcohol of the formula:

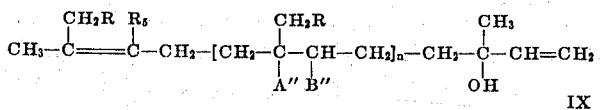

wherein A″ and B″, R, $R_5$ and n are as above, by the following reaction scheme:

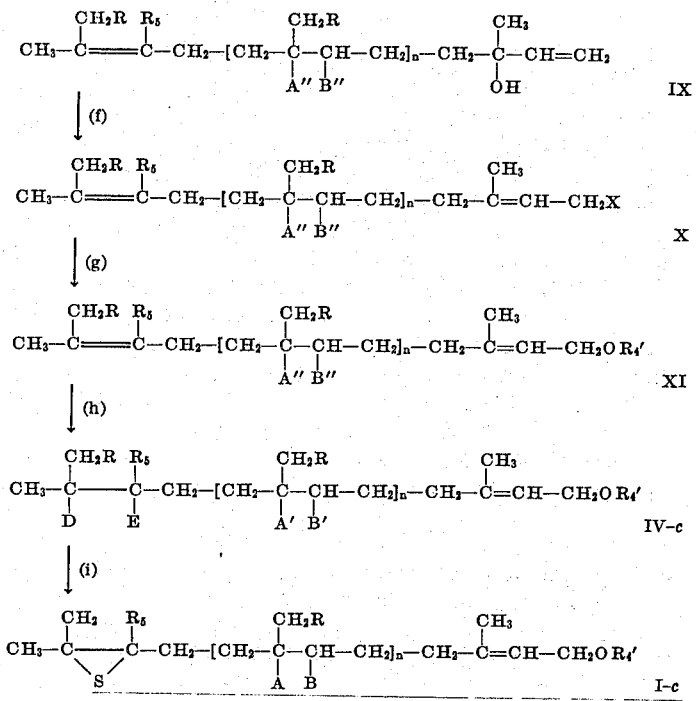

wherein A′ and B′, A″ and B″, A and B, D and E, R, $R_5$, $R_4'$ and n are as above, and X is a halogen.

The compound of formula IX above is converted to the compound of formula X above via reaction step (f) by subjecting the compound of formula IX above to halogenation in the presence of a base. Any conventional method of halogenation can be utilized in carrying out the reaction of step (f). Generally, the halogenation can be carried out by treating the compound of formula IX above with a halogenating agent such as a thionyl halide or a phosphorous trihalide in the presence of a base. Among the preferred halogenating agents are included phosphorous tribromide, phosphorous pentachloride, thionyl chloride, etc. Any conventional base such as the bases mentioned hereinbefore can be utilized in carrying out this reaction. Among the preferred bases are included the tertiary amines such as pyridine. In carrying out this reaction, an inert organic solvent medium is generally utilized. Any conventional inert organic solvent such as hexane or ether can be utilized. Furthermore, this reaction is generally carried out at a temperature of from about −15° to 30°C.

The compound of formula X can be converted to the compound of formula XI by reacting the compound of formula X with a compound of the formula:

$$MO-R_4' \qquad XXII$$

wherein M is an alkali metal such as potassium, sodium, lithium, etc. and $R_4'$ is as above. Any of the conditions conventional in reacting alkali metal alcoholates or alkali metal alkanoates with primary halides can be utilized in carrying out this reaction.

The reaction of step (h) wherein the compound of formula XI above is converted into the compound of formula IV–c above is carried out by either the epoxidation technique or the halohydrin technique described in connection with step (a). The conversion of compounds of the formula IV-c into compounds of the formula I–c is carried out by the episulphidization technique described in connection with step (b).

The compounds of the formula I–c wherein $R_4'$ is lower alkanoyl, benzoyl or lower alkyl substituted benzoyl, can be converted by saponification to the free alcohol, i.e., where $R_4'$ is hydrogen by ester saponification. Any conventional method of ester saponification can be utilized in converting such compounds to the free alcohol.

The free alcohol of formula I–c above can be converted into the corresponding alkali metal salt by treating this free alcohol with an alkali metal base in the presence of an inert organic solvent. Any conventional alkali metal base can be utilized in this conversion. Among the bases that can be utilized are included potassium tertiary butylate, alkali metals, alkali metal hydrides, preferably sodium hydride. In carrying out this reaction, any conventional inert organic solvent can be utilized. Among the inert organic solvents which can be utilized are included benzene, toluene, dimethyl formamide, dioxane, dimethoxy ethane, In carrying out this reaction, temperature and pressure are not critical and this reaction can be carried out at room temperature and atmospheric pressures. However, if desired, lower or higher temperatures can be utilized.

The alkali metal salts prepared above can be converted to the corresponding ethers by etherification with an alkyl or aryl or aralkyl halide. The halide group is preferably an iodine or bromine group. This etherification reaction can be carried out in any of the inert solvents mentioned above. Preferably, this reaction is carried out in an aprotic solvent such as hexamethyl phosphoric acid triamide. Furthermore, in carrying out this reaction temperatures and pressures are not critical and this reaction can be carried out at room temperature and atmospheric pressure. Alternatively, this reaction can be carried out at higher or lower temperatures, generally this reaction is carried out at a temperature of from about 0°C. to the reflux temperature of the reaction mixture.

Alternatively, the free alcohols of the formula I–c, i.e., where $R_4'$ is H, can be esterified. This esterification reaction can be carried out in the same manner described above in connection with the etherification reaction. However, in the esterification reaction, the lower alkanoic, lower aroyl, lower aralkanoic acid is utilized. The acid can be in its derivative form such as its anhydride or acid halide forms. In the esterification reaction, there is no need to convert the free alcohol starting material of formula I–c to its alkali metal salt. If the conversion of the alcohol to the alkali metal salt is omitted, the reaction of the alcohol of formula I–c is carried out with an acylating agent in the presence of an acid binding agent. Any conventional acid binding agent such as pyridine and triethylamine can be utilized in carrying out this reaction.

The following examples are illustrative but not limitative of this invention. The ether utilized in these examples was diethyl ether. The temperature in all of these examples is in degrees Centigrade.

EXAMPLE 1

33.3 g of 3-bromo-12-methoxy-2,6,10-trimethyl-dodecadien-2-ol [cis and trans mixture] are heated under reflux conditions for 1 hour together with 7.6 g. of thiourea and 150 ml. of absolute ethanol. The reaction mixture is cooled to 40°C., after the addition of 6.9 g. of potassium carbonate in 25 ml. of water, stirred for 2 hours and subsequently concentrated under reduced pressure. The concentrate is taken up with water and exhaustively extracted with ether. The extract is washed with a saturated aqueous sodium chloride solution, dried over sodium sulfate and evaporated. The residual (10,11-epithio-3,7,11-trimethyl-2,6-cis/trans-dodecadienyl) methyl ether is purified by chromatographing on Kieselgel [eluting agent hexane-acetic acid ethyl ester (80:20 parts by volume)], b.p. 97°–98 °C./0.025 mm Hg; $n_D^{20} = 1.5016$.

EXAMPLE 2

7.3 g. of 10,11-epoxy-1-methoxy-3,7,11-trimethyl-2-cis/trans, 6-cis-dodecadiene are added dropwise at 0°–5 °C. with strong stirring to a suspension of 2.15 g. of thiourea in 14 ml. of 2-N-sulfuric acid. The reaction mixture is further stirred for 2.5 hours at 0°–5°C., then treated with 1.5 g. of sodium carbonate in 5.5 ml. of water and heated under reflux condition for 2 hours. The mixture is subsequently cooled, diluted with water and exhaustively extracted with ether. The extract is washed with a saturated aqueous sodium chloride solution, dried over sodium sulfate and evaporated. The residual (10,11-epithio-3,7,11-tri-methyl-2-cis/trans, 6-cis-dodecadienyl) methyl ether is purified by chromatographing on Kieselgel [eluting agent hexane-acetic acid ethyl ester (60:40 parts by volume)], b.p. 95°–96C./0.01 mm Hg; $n_D^{20} = 1.5022$.

EXAMPLE 3

To a suspension of 2.3 g. of finely pulverized thiourea in 15.1 ml. of 2-N sulfuric acid, 8 g. of (10,11-epoxy-3,7,11-trimethyl-2,6-tridecadienyl) methyl ether was added dropwise under constant stirring while cooling with ice. The resulting mixture was allowed to stand for 2 hours under constant mixing while cooling with ice. After this period, a solution containing 1.6 g. of sodium carbonate in 6 ml. of water were added dropwise to the reaction mixture while it stood for 1 hour at room temperature. The reaction mixture was poured into water and exhaustively extracted with diethyl ether. The extract was washed with a saturated aqueous sodium chloride solution, dried over sodium sulfate and evaporated. The residual (10,11-epithio-3,7,11-trimethyl-2,6-tridecadienyl) methyl ether was purified by chromatographing on Kieselgel [eluting agent hexane/ethyl acetate (4:1 parts by volume)], b.p. 110°C./0.001 mm Hg, (bulb tube distillation); $n_D^{20} = 1.5008$.

By the same procedure, (10,11-epoxy-7-ethyl-3,11-dimethyltrideca-2,6-dienyl) methyl ether was converted to (10,11-epithio-7-ethyl-3,11-dimethyl-trideca-2,6-dienyl) methyl ether and (10,11-epoxy-3,7,10,11-tetramethyl-dodeca-2,6-dienyl) methyl ether was converted to (10,11-epithio-3,7,10,11-tetramethyl-dodeca-2,6-dienyl) methyl ether.

EXAMPLE 4

3 g. of 10,11-epoxy-3,7,11-trimethyl-1-[(p-benzyl phenyl)-oxy]-2-cis/trans, 6-cis-dodecadiene are mixed together with 5.65 g. of thiourea, 17 ml. of dioxan and 3.7 ml. of 2-N sulfuric acid. The homogeneous solution is allowed to stand in the cold (ca 0°) for 8 hours. It is subsequently treated with 390 mg. of sodium carbonate in 1.5 ml. of water, stirred at room temperature for 3 hours, then diluted with water and exhaustively extracted with acetic acid ethyl ester. The extract is washed several times with a saturated aqueous sodium chloride solution, dried over sodium sulfate and evaporated. The residual (p-benzyl phenyl)(10,11-epithio-3,7,11-trimethyl-2-cis/trans, 6-cis-dodecadienyl) ether can be purified by chromatographing on Kieselgel [eluting agent hexane-acetic acid ethyl ester (80:20 parts by volume)], $n_D^{20} = 1.5639$.

The 10,11-epoxy-3,7,11-trimethyl-1-[(p-benzyl phenyl)-oxy]-2-cis/trans, 6-cis-dodecadiene employed as the starting compound can, for example, be manufactured as follows:

28.5 g. of 2-cis/trans, 6-cis-farnesyl bromide are added dropwise within 15 minutes at room temperature with stirring to a mixture of 20.2 g. of p-benzyl phenol, 20.8 g. of potassium carbonate and 100 ml. of acetone. The reaction mixture is heated under reflux conditions for 12 hours and subsequently concentrated. The concentrate is poured into 600 ml. of ice-water and exhaustively extracted with hexane. The extract is washed in 1-N caustic soda and subsequently neutral with a saturated aqueous sodium chloride solution, dried over sodium sulfate and evaporated. The residual (p-benzyl phenyl)(3,7,11-trimethyl-2-cis/trans,6-cis,10-dodecatrienyl)ether can be purified by chromatographing on Kieselgel [eluting agent hexane-acetic acid ethyl ester (98:2 parts by volume)], b.p. 195°–200 °C./0.005 mm Hg.

7.21 g. of N-bromosuccinimide are introduced within 20 minutes at 1°–3°C. while gassing with argon into a mixture of 15.0 g. of (p-benzyl phenyl)(3,7,11-trimethyl-2-cis/trans, 6-cis,10-dodecatrienyl) ether, 16 ml. of water and 90 ml. of tetrahydrofuran. The reaction mixture is stirred at 0°–3°C. for 5 hours, then poured into 100 ml. of ice-water and exhaustively extracted with hexane. The extract is washed with a saturated aqueous sodium chloride solution, dried over sodium sulfate and evaporated under reduced pressure. The residual 3-bromo-2,6,10-trimethyl-12-[(p-benzyl phenyl)-oxy]-6-cis,10-cis/trans-dodecadien-2-ol is purified by chromatographing on Kieselgel [eluting agent hexane-acetic acid ethyl ester (90:10 parts by volume)].

9.2 g. of 3-bromo-2,6,10-trimethyl-12-[(p-benzyl phenyl)-oxy]-6-cis,10-cis/trans-dodecadien-2-ol in 40 ml. of methanol are treated dropwise within 15 minutes at 1°–3°C. with a solution of 0.44 g. of sodium in 10 ml. of methanol. The reaction mixture is stirred at 1°–3°C. for 30 minutes, then poured into 100 ml. of ice-water and exhaustively extracted with hexane. The extract is dried over sodium sulfate and evaporated under reduced pressure. The residual 10,11-epoxy-3,7,11-trimethyl-1-[(p-benzyl phenyl)-oxy]-2-cis/trans, 6-cis-dodecadiene is purified by chromatographing on Keiselgel [eluting agent hexane-acetic acid ethyl ester (80:20 parts by volume)].

EXAMPLE 5

5.2 g. of 10,11-epoxy-N,N-diethyl-3,7,11-trimethyl-2-trans, 6-cis-dodecadienoic acid amide are added dropwise at 0° with stirring to a suspension of 1.29 g. of thiourea in 8.45 ml. of 2-N sulfuric acid. The reaction mixture is stirred at 0°–5°C. for 2 hours, then treated with 900 mg. of sodium carbonate in 4 ml. of water and again stirred at room temperature for 2 hours. The mixture is subsequently diluted with water and exhaustively extracted with ether. The extract is washed with a saturated aqueous sodium chloride solution, dried over sodium sulfate and evaporated. The residual 10,11-epithio-N,N-diethyl-3,7,11-trimethyl-2-trans, 6cis-dodecadienoic acid amide can be purified by chromatographing on Kieselgel [eluting agent hexane-acetic acid ethyl ester (40:60 parts by volume)], $n_D^{20} = 1.5135$.

By the procedure given above, 10,11-epoxy-N,N-diethyl-3,7,11-trimethyl-2,6-tridecadienoic-1-acid amide is converted to 10,11-epithio-N,N-diethyl-3,7,11-trimethyl-2,6-tridecadienoic-1-acid amide; 10,11-epoxy-N,N-diethyl-7-ethyl-3,11-dimethyl-2,6-tridecadienoic-1-acid amide is converted to 10,11-epithio-N,N-diethyl-7-ethyl-3,11-dimethyl-2,6-tridecadineoic-1-acid amide; and 10,11-epoxy-N,N-diethyl-3,7,10,11-tetramethyl-2,6-dodecadienoic-1-acid amide is converted to 10,11-epithio-N,N-diethyl-3,7,10,11-tetramethyl-2,6-dodecadienoic-1-acid amide.

EXAMPLE 6

To a suspension of 5.35 g. of finely pulverized thiourea in 35 ml. of 2-N-sulfuric acid, 20.7 g. of 10,11-epoxy-3,7,11-trimethyl-2,6-tridecadienoic acid ethyl ester was added dropwise and mixed under constant stirring while cooling with ice. The resulting mixture was allowed to stand for 2 hours under constant stirring while cooling with ice. After this period, a solution containing 3.95 g. of sodium carbonate in 25 ml. of water was added dropwise to the reaction mixture and the mixture was allowed to stand for 1 hour at room temperature. The reaction mixture was poured into water and exhaustively extracted with diethyl ether. The extract was washed with a saturated sodium chloride solution, dried over sodium sulfate and evaporated. The residual 10,11-epithio-3,7,11-trimethyl-2,6-tridecadienoic acid ethyl ester was purified by chromatographying on Kieselgel [eluting agent hexane/diethyl ether (4:1 parts by volume)]. B.P. about 120°C./ 0.01 Hg, (bulb tube distillation); $n_D^{20} = 1.5067$.

EXAMPLE 7

To a suspension of 2.45 g. of finely pulverized thiourea in 16 ml. of 2-N-sulfuric acid, 9 g. of 10,11-epoxy-3,7,11-trimethyl-2-cis/trans, 6-trans-dodecadienoic acid ethyl ester were added dropwise under constant stirring while cooling with ice. The reaction mixture was then allowed to stand under constant stirring for 3 hours at room temperature. After this period, a solution containing 1.8 g. of sodium carbonate in 10 ml. of water was added dropwise to the reaction mixture. The reaction mixture was allowed to stand for 1 hour at room temperature under constant stirring. The reaction mixture was poured into water and exhaustively extracted with diethyl ether. The extract was washed with a saturated aqueous sodium chloride solution, dried over sodium sulfate and evaporated. The residual 10,11-epithio-3,7,11-trimethyl-2-cis/trans, 6-trans-dodecadienoic acid ethyl ester was purified by chromatographing on Kieselgel [eluting agent hexane/ethyl acetate (4:1 parts by volume)]. B.p. was about 115°C./0.001 mm Hg (bulb tube distillation); $n_D^{20} = 1.5068$.

EXAMPLE 8

To a suspension of 1 g. of finely pulverized thiourea in 4 g. of 10,11-epoxy-7-ethyl-3,11-dimethyl-2,6-tridecadienoic acid ethyl ester there was added dropwise 7 ml. of 2-N-sulfuric acid. This addition was accomplished under constant stirring at 0°C. for 2 hours. After this period, a solution containing 750 mg. of sodium carbonate in 3 ml. of water was added and the reaction mixture was allowed to stand for 1 hour at room temperature. The reaction mixture was poured into ice-water and exhaustively extracted with diethyl ether. The extract was washed with a saturated aqueous sodium chloride solution, dried over sodium sulfate and evaporated. The residual, 10,11-epithio-7-ethyl-3,11-dimethyl-2,6-tridecadienoic acid ethyl ester was purified by chromatographing on Kieselgel [eluting agent hexane/diethyl ether (9:1 parts by voume)]. B.p. about 125°C./0.005 mm Hg; (bulb tube distillation); $n_D^{20} = 1.5048$.

EXAMPLE 9

To an ice-cooled suspension of 3.88 g. of finely pulverized thiourea in 15 g. of 10,11-epoxy-3,7,10,11-tetramethyl-dodeca-2,6-dienoic acid ethyl ester, 25.5 ml. of 2-N-sulfuric acid were added dropwise under constant stirring. The mixture was allowed to stand at room temperature for 3 hours under constant stirring. After this period, a solution containing 2.87 g. of sodium carbonate in 16 ml. of water were added dropwise to the reaction mixture. The reaction mixture was allowed to stand for 1.5 hours at room temperature under constant stirring. The reaction mixture was then poured into ice-water and exhaustively extracted with diethyl ether. The extract was washed with a saturated aqueous sodium chloride solution, dried over sodium sulfate, and evaporated. The residual 10,11-epithio-3,7,10,11-tetramethyldodeca-2,6-dienoic acid ethyl ester was purified by chromatographing on Kieselgel [eluting agent hexane/ethyl acetate (4:1 parts by volume)]. A small sample distilled at about 125°C./0.001 mm Hg. (bulb tube distillation); $n_D^{20} = 1.5081$.

EXAMPLE 10

To a solution of 100 g. of 6,9,10-trimethyl-undeca-5,9-dien-2-one in 2,000 ml. of methylene chloride, there was added, while cooling with ice, 100 g. of m-chloro perbenzoic acid. The resulting mixture was allowed to stand while constantly stirring at room temperature for 1 hour. The resulting mixture was diluted with 1,000 ml. of methylene chloride. The resulting solution was washed with ice-cold 1-N sodium hydroxide solution and with a saturated sodium chloride solution, dried over sodium sulfate and evaporated. The residue was fractionally distilled under high vacuum. There was obtained 9,10-epoxy-6,9,10-trimethylundec-5-en-2-one. B.p. 89°–91°C./0.07 mm Hg; $n_D^{20} = 1.4656$.

To a solution of 25 g. of 9,10-epoxy-6,9,10-trimethyl-undec-5-en-2-one and 24.8 g. of diethyl phosphonoacetic acid ethyl ester in 160 ml. of absolute ethanol, there was added dropwise while cooling with ice, a solution containing 2.56 g. of sodium in 65 ml. of absolute ethyl alcohol. The mixture was allowed to stand for 14 hours at room temperature and evaporated subsequently under vacuum. The residue was poured into a saturated aqueous sodium chloride solution, exhaustively extracted with diethyl ether, washed with a saturated aqueous sodium chloride solution, dried over sodium sulfate and evaporated. Fractional distillation at high vacuum gave 10,11-epoxy-3,7,10,11-tetramethyl-2,6-dodecadienoic acid ethyl ester. B.p. 110°–113°C./0.01 mm Hg; $n_D^{20} = 1.4792$.

EXAMPLE 11

To a solution containing 7.9 g. of 9,10-epithio-6,10-dimethyl-undec-5-trans-en-2-one and 7.85 g. of diethyl phosphonoacetic acid ethyl ester in 40 ml. of absolute ethanol, there was added, while cooling with ice-water, a solution containing 0.8 g. of sodium in 20 ml. of absolute ethanol. The sodium solution was added dropwise. The mixture was allowed to stand for 4 hours at room temperature while constantly stirring. The resulting mixture was poured into ice-water and exhaustively extracted with diethyl ether. The ether extract was washed with a saturated aqueous sodium chloride solution, dried over sodium sulfate and evaporated. The residual, 10,11-epithio-3,7,11-trimethyl-2-cis/trans,6-trans-dodecadienoic acid ethyl ester was chromatographed on Kieselgel [solvent was hexane/ethyl acetate (4:1 parts by volume)]. B.p. about 115°C./0.001 mm Hg; $n_D^{20} = 1.5069$.

EXAMPLE 12

To a suspension of 31.5 g. of 9,10-epoxy-6,10-dimethyl-undec-5-trans-en-2-one and 11.4 g. of thiourea, 75 ml. of 2-N-sulfuric acid were added dropwise under intensive stirring and cooling with ice. The resultant mixture was allowed to stand for 2 hours under constant stirring while cooling with ice. After this period, a solution of 7.95 g. of sodium carbonate in 35 ml. of water were added dropwise to the resulting mixture. After this, the mixture was allowed to stand for 1 hour at room temperature while constantly stirring. The resulting mixture was poured into a saturated sodium chloride ice-water solution. The reaction mixture was then exhaustively extracted with diethyl ether. The extract was washed with a saturated aqueous sodium chloride solution, dried over sodium sulfate and evaporated. The residual 9,10-epithio-6,10-dimethyl-undec-5-trans-en-2-one was purified by chromatography on Kieselgel [eluting agent hexane/diethyl ether (4:1 parts by volume)], b.p. 85°C./0.001 mm Hg. (bulb tube distillation); $n_D^{20} = 1.4985$.

EXAMPLE 13

To a solution of 7.2 g. of 9,10-epithio-6,9,10-trimethylundec-5-cis/trans-en-2-one and 6.73 g. of diethyl phosphonoacetic acid ethyl ester in 30 ml. of absolute ethanol, there was added dropwise with ice-water cooling, a solution of 0.69 g. of sodium in 15 ml. of ethanol. The mixture was allowed to stand under constant stirring under room temperature for 4 hours.

After this period, it was poured into ice-water, extracted with diethyl ether. The extract was washed with a saturated aqueous sodium chloride solution, dried over sodium sulfate and evaporated. The residual 10,11-epithio-3,7,10,11-tetramethyl-2,6-dodecadienoic acid ethyl ester was purified by chromatographing on Kieselgel [eluting agent hexane/acetic acid ethyl ester (4:1 parts by volume)]. B.p. 115°C./0.001 mm Hg; (bulb tube distillation); $n_D^{20} = 1.4792$.

EXAMPLE 14

To a suspension of 6.7 g. of thiourea in 22.4 g. of 9,10-epoxy-6,9,10-trimethyl-undec-5-cis/trans-en-2-one, there was added dropwise under intensive stirring 50 ml. of 2-N sulfuric acid. This addition was carried out while cooling with ice. The mixture was allowed to stand under constant stirring and cooling with ice for a period of 2 hours. After this period, a solution of 5.3 g. of sodium carbonate in 20 ml. of water were added dropwise to the reaction mixture. The reaction mixture was allowed to stand for a period of 1.5 hours at room temperature under constant stirring. The resulting solution was poured over ice-water and exhaustively extracted with diethyl ether. The extract was washed with a saturated aqueous sodium chloride solution, dried over sodium sulfate, and evaporated. The residual, 9,10-epithio-6,9,10-trimethyl-undec-5-cis/trans-en-2-one was purified by chromatographing on Kieselgel [eluting agent hexane/diethyl ether (3:1 parts by volume)]. B.p. 85°C./0.001 mm Hg (bulb tube distillation); $n_D^{20} = 1.5016$.

EXAMPLE 15

To an ice-cold suspension of 2.05 g. of finely pulverized thiourea in 6.2 g. of 10,11-epoxy-3,7,11-trimethyl-dodeca-2-cis/trans, 6-trans-dienenitrile, there was added dropwise under constant stirring, 13.3 ml. of 2-N-sulfuric acid. The mixture was allowed to stand for 2 hours while cooling with ice and constant stirring. To this mixture there was added a solution of 1.4 g. of sodium carbonate in 6 ml. of water. The resulting mixture was allowed to stand for 1.5 hours at room temperature. The resulting mixture was then poured on ice-water and exhaustively extracted with diethyl ether. The ether extract was washed with a saturated aqueous sodium chloride solution, dried over sodium sulfate and evaporated. The residual 10,11-epithio-3,7,11-trimethyl-dodeca2-cis/trans,6-trans-dienenitrile was purified by chromatography on Kieselgel [eluting agent hexane/diethyl ether (6:4 parts by volume)]. B.p. about 120°C./0.05 mm Hg (bulb tube distillation); $n_D^{20} = 1.5171$.

The starting material was prepared in the following manner:

To an ice-cold solution of 21 g. of 9,10-epoxy-6,10-dimethylundec-5-trans-en-2-one and 18 g. of diethyl phosphonoacetonitrile in 100 ml. of absolute ethanol there was added dropwise under constant stirring a solution of 2.3 g. of sodium in 50 ml. of absolute ethanol. The mixture was allowed to stand for 4 hours at room temperature under constant stirring. After this period, the resultant mixture was evaporated under vacuum. The residue was added to a saturated sodium chloride solution and extracted with diethyl ether. The ether extract was washed with a saturated aqueous sodium chloride solution, dried over sodium sulfate and evaporated. The residual 10,11-epoxy-3,7,11-trimethyl-dodeca-2-cis/trans, 6-trans-dienenitrile was obtained from the extract by fractional distillation. B.p. 109°–113°C./0.2 mm Hg; $n_D^{20} = 1.4848$.

By the above procedure 10,11-epoxy-3,7,10,11-tetramethyldodeca-2,6-dienenitrile was converted to 10,11-epithio-3,7,10,11-tetramethyl-dodeca-2,6-dienenitrile; 10,11-epoxy-3,7,11-trimethyl-trideca-2,6-dienenitrile was converted to 10,11-epithio-3,7,11-trimethyl-trideca-2,6-dienenitrile; and 10,11-epoxy-7-ethyl-3,11-dimethyl-trideca-2,6-dienenitrile is converted to 10,11-epithio-7-ethyl-3,11-dimethyl-trideca-2,6-dienenitrile.

EXAMPLE 16

Sterilization effect against *Tineola biselliella*.

Short wool strips having an area of 10 cm² were moistened with a solution of the active substance in acetone. The strips were dried at 20°C. For each variation in concentration of the active substance there was a control strip (a strip which was moistened only with acetone). The strips were suspended in a plastic beaker containing 20 freshly hatched clothes moths. The clothes moths were allowed to lay eggs on the strip for a period of 4 days at 25°C. After this period, the strips were transferred to small plastic boxes until the larvae hatched. The untreated strips (control) were suspended in the beaker for 4 days in the same manner as the treated strips. In the following table, sterilization activity of the test compound is given as the percent mortality based upon the control strip. The dosage in the table is given as $10^{-x}$ g activity substance/cm² of wool strips. Thus, dosages of 3 are given as $10^{-3}$ g/cm² of wool strips.

TABLE

| Active Substance | Concentration $10^{-x}$g of Active Substance/cm² by Dosage | mortality |
| --- | --- | --- |
| 10,11-epithio-3,7,11-trimethyl-2,6-tridecadienoic acid ethyl ester | 3<br>4<br>5 | 80<br>—<br>50 |

EXAMPLE 17

4.8 g. of sodium hydride (50 percent by weight in mineral oil) are washed twice with 50 ml. of absolute hexane and after the addition of 25 ml. of absolute tetrahydrofuran are treated dropwise at 10°–12°C. with 12.6 g. of N,N-diethyl-diethylphosphonoacetamide. The reaction mixture is stirred for 1 ½ hours at room temperature and subsequently treated dropwise at 10°–12C. with 11.4 g. of 9,10-epoxy-6,9,10-trimethyl-5-undecen-2-one. The mixture is stirred at room temperature for 20 hours, treated under ice cooling with 10 ml. absolute ethanol in order to destroy excess sodium hydride, poured into a saturated sodium chloride solution and extracted with ether. The combined extracts are washed neutral, dried and evaporated. Pure 10,11-epoxy-N,N-diethyl-3,7,10,11-tetramethyl-2,6-dodecadien-1-oi acid amide is obtained by high vacuum distillation, which boiled at 132°–135°C./0.001 mm Hg; $n_D^{20}$ : 1.4913.

We claim:

1. A compound of the formula:

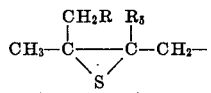

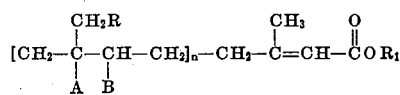

wherein A and B are hydrogen or taken together form a carbon to carbon bond or a sulfur bridge; $R_1$ is hydrogen or lower alkyl; $R_5$ is methyl or hydrogen; $R_1$ is selected from the group consisting of hydrogen, loweralkyl or

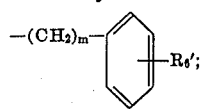

$R_6'$ is hydrogen, lower alkyl, hydroxy, lower alkoxy or halogen, $m$ is an integer of from 0 to 1; and $n$ is an integer from 0 to 1.

2. The compound of claim 1 wherein said compound is 10,11-epithio-3,7,11-trimethyl-2,6-tridecadienoic acid ethyl ester.

3. The compound of claim 1 wherein said compound is 10,11-epithio-3,7,11-trimethyl-2-cis/trans,6trans-dodecadineoic acid ethyl ester.

4. The compound of claim 1 wherein said compound is 10,11-epithio-7-ethyl-3,11-dimethyl-2,6-tridecadienoic acid ethyl ester.

5. The compound of claim 1 wherein said compound is 10,11-epithio-3,7,10,11-tetramethyl-dodeca-2,6-dienoic acid ethyl ester.

6. A process for producing an epithio compound of the formula:

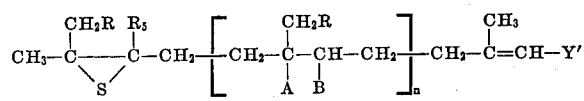

wherein A and B are hydrogen or taken together form a carbon to carbon double bond or a sulfur bridge; R is hydrogen or lower alkyl; $R_5$ is methyl or hydrogen; $Y'$ is C ≡ N; $COOR'_1$; or

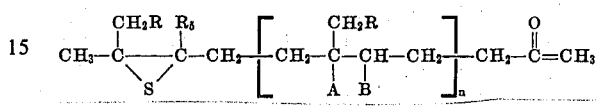

$R'_1$ is lower alkyl, phenyl, benzyl, or phenyl or benzyl substituted by lower alkyl, hydroxy, lower alkoxy, or halogen; $R_2$ and $R_3$ are hydrogen or lower alkyl, or taken together with their attached nitrogen atom form a pyrrolidino, piperidino or morpholino ring; and $n$ is an integer from 0 to 1; comprising reacting a compound of the formula:

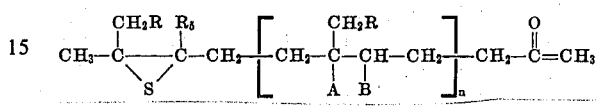

wherein R, $R_5$, A, B and n are as above; with a phosphine oxide of the formula;

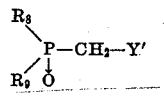

wherein $Y'$, $R'_1$, $R_2$ and $R_3$ are as above; $R_8$ and $R_9$ are lower alkoxy or phenoxy; or phenoxy substituted with a radical selected from the group consisting of lower alkoxy, nitro or halo; in the presence of an alkali metal base in an inert organic solvent at a temperature of from 0° to 30°C.

7. The process of claim 6 wherein $Y'$ is $-COOR'_1$, comprising the additional step of saponifying said compound to produce an acid of the formula:

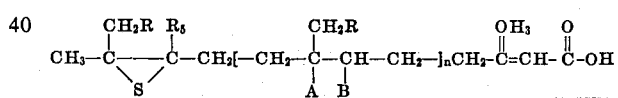

wherein $n$, R, $R_5$ and A and B are as above.

* * * * *

UNITED STATES PATENT OFFICE
CERTIFICATE OF CORRECTION

Patent No. 3,697,543  Dated October 10, 1972

Inventor(s) Pfiffner and Schwieter

It is certified that error appears in the above-identified patent and that said Letters Patent are hereby corrected as shown below:

Add Priority claims

Switzerland No. 14522/68 September 27, 1968 and
  Switzerland No. 13141/69 August 29, 1969

Column 21, line 11   "$R_1$ is hydrogen"   should be

R is hydrogen

Column 22, line 40 - Claim 7

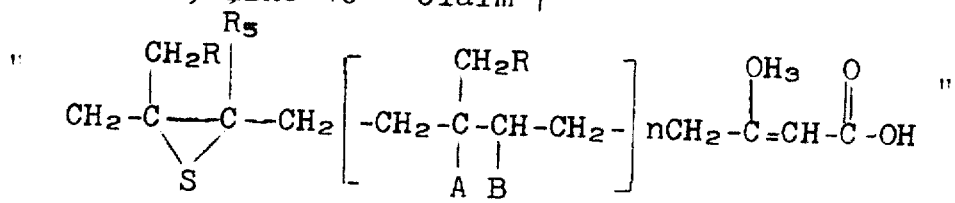

should be

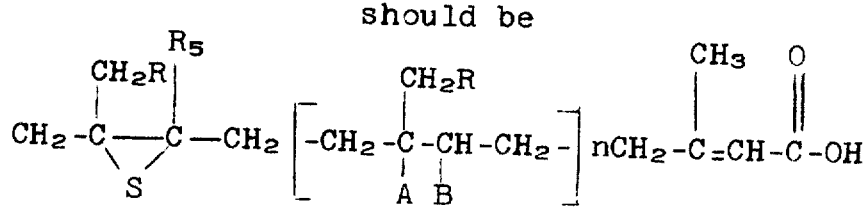

Signed and sealed this 31st day of December 1974.

(SEAL)
Attest:

McCOY M. GIBSON JR.  C. MARSHALL DANN
Attesting Officer    Commissioner of Patents